METHOD OF METAL COATING AN EPOXY SURFACE

Filed Aug. 20, 1971 2 Sheets-Sheet 1

INVENTORS
D. DINELLA
J. T. KENNEY
BY J. Rosenstock
ATTORNEY

Sept. 11, 1973 D. DINELLA ET AL 3,758,332

METHOD OF METAL COATING AN EPOXY SURFACE

Filed Aug. 20, 1971 2 Sheets-Sheet 2

United States Patent Office 3,758,332
Patented Sept. 11, 1973

3,758,332

METHOD OF METAL COATING AN EPOXY SURFACE

Donald Dinella, Clark Township, Union County, and John Thomas Kenney, Lawrence Township, Mercer County, N.J., assignors to Western Electric Company, Incorporated, New York, N.Y.

Filed Aug. 20, 1971, Ser. No. 173,551
Int. Cl. B44d *1/092;* C07b *13/00;* C23c *3/00*
U.S. Cl. 117—47 A 17 Claims

ABSTRACT OF THE DISCLOSURE

A method of improving adhesive properties of a cured epoxy surface resulting from curing an uncured bisphenol A-epichlorohydrin epoxy is disclosed. The method comprises exposing the cured epoxy surface to a suitable swellant to swell the surface. Some typical suitable swellants are methyl ethyl ketone, tetrahydrofuran, dioxane, pyridine, dimethylformamide and a mixture of methyl ethyl ketone, ethyl alcohol and methyl alcohol. The swelled surface is then exposed to a suitable acidic etching solution comprising $H_2SO_4$, $H_3PO_4$ and $Cr^{+6}$ ions, to etch the surface.

BACKGROUND OF THE INVENTION (1) Field of the invention

This invention relates to a method of improving adhesive properties of an epoxy surface and more particularly, to improving adherence of a selected species to a surface of a cured epoxy resulting from a bisphenol A-epichlorohydrin epoxy.

(2) Description of the prior art

During the past few years, a market for metal plated plastic parts has grown rapidly as manufacturers have begun to appreciate the functional appearance of such parts when plated with bright, metallic finishes, and to take advantage of economies in cost and weight afforded by substituting molded plastic parts for metal. Furthermore, such plated finishes are not as susceptible to pitting and corrosion because there is no galvanic reaction between a plastic substrate and a plated metal.

Because plastic materials do not conduct electricity, it is common practice to provide a conductive layer or coating, such as copper, by electroless deposition so that an additional thickness of metals, particularly copper, nickel, and chromium, can be electrolytically plated onto the electroless copper layer. Electroless deposition refers to a chemical deposition of an adherent metal coating on a conductive, non-conductive, or semiconductive substrate in the absence of an external electrical source. While there are several methods of applying this metallic coating by a combined use of electroless and electrolytic procedures, it was not until quite recently that processes were developed which can provide even minimal adhesion of the conductive coating to the plastic. This is because overall adhesion is governed by the bond strength between the plastic substrate and the electroless copper layer. Even with these improved processes, reasonable adhesion can be obtained with only a very few plastics, and then only when great care is taken in all of the steps for the preparation and plating of the plastic substrate.

A plastic extensively employed and upon which electroless deposition is conducted, especially in the printed circuit industry is a cured epoxy resulting from curing an uncured condensation reaction product of epichlorohydrin and bisphenol A. The uncured condensation reaction product or epoxy resin has the general structure

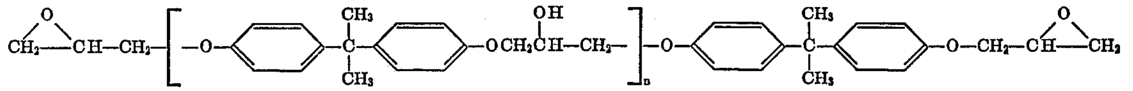

where $n$ is the number of repeated units in the resin chain. The varying types of these epoxy resins are described in terms of their melting point, epoxide equivalent and equivalent weight. The epoxide equivalent is defined as the number of grams of resin containing one gram equivalent of epoxide. The epoxide equivalent is determinative of the number of repeated units in the epoxy resin chain. The equivalent weight is defined as the number of grams of resin required to esterify completely one gram mole of monobasic acid such as, for example, 60 grams of acetic acid.

One of the valuable properties of epoxy resins is their ability to transform readily from a liquid or thermoplastic state to tough, hard thermoset solids, i.e., transform from a linear structure to a network crosslinked in three dimensions. This hardening is accomplished by the addition of a chemically active reagent known as a curing agent. Some curing agents promote curing by catalytic action, others participate directly in the curing reaction and are absorbed into the resin chain.

The surface of a cured or crosslinked epoxy article is normally glossy and quite hydrophobic. Since electroless depositions usually employ aqueous sensitizing and activating solutions having metal ions therein, the surface will not normally be wet thereby. In such a situation, the sensitizing and activating solutions will not wet the surface, the metal ions will not be adsorbed onto the surface and deposition of the metal ions will not proceed. If deposition does somehow occur, metal deposited on the surface will lack adhesion.

In the present state of the art, various methods are available for rendering the surface of a polymer or a plastic material hydrophilic. One method in common practice in plating plastic materials entails mechanical roughening of the surface of the plastic. Initially, this surface roughening is accomplished by some form of mechanical deglazing, such as scrubbing with an abrasive slurry, wet tumbling, dry rolling or abrasive (sand) blasting. However, this prior art method gives an adherence of 3 lbs./in. for a copper pattern on a cured bisphenol A-epichlorohydrin. This adherence is unsatisfactory for promoting an adhesion necessary for cured bisphenol A-epichlorohydrin printed circuit boards having a copper pattern thereon. It has been empirically established that a minimum peel strength of about 5 lbs./in., at a 90° peel and a peel rate of 2 in./min. is required to prevent a metal coating from blistering or peeling from a plastic surface during manufacture and use. The adhesion requirements for such bisphenol A-epichlorohydrin boards is therefore at least 5 lbs./in. at a 90° peel and a peel rate of 2 in./min.

In addition, the mechanical deglazing process is extremely costly in that many parts have to be finished by hand and, in the case of relatively small parts, or parts with complex contours, it is very difficult to abrade the surface uniformly by conventional means. Another disadvantage to mechanical etching is that it is hard to control and many problems are encountered when the surface abrasion is carried too far. Of greatest disadvantage, however, is in forming printed circuits, utilizing a photoimaging process, such as the photoselective metal deposition process revealed in De Angelo et al., Ser. No. 719,976, filed Apr. 9, 1968, now U.S. Pat. 3,562,005 and assigned to the assignee hereof. The photoimaging process inherently requires a high pattern resolution. This resolution is limited by the topography of the surface on which the pattern is generated. When mechanical deglazing is employed, e.g., by sand blasting, the resolution of the pattern suffers because of the mechanically roughened surface.

In more recent years, chemical deglazing or etching techniques were developed for various plastics using strong acidic solutions. U.S. Pat. 3,437,507 reveals a chromic acid treatment of plastics, such as an acrylonitrilebutadiene-styrene (A-B-S) and an amine catalyzed or cured bisphenol-A-epichlorohydrin epoxy, to improve the adherence of an electroless deposit to the surface thereof. The A-B-S is a polystyrene copolymer systerm rich in one component (styrene) and having other components (acrylonitrile, rubber) which form different phases. The epoxy, on the other hand, is a single phase system. Again, as indicated above, a minimum adhesion value of 5 lbs./in. has to be met for bisphenol-A-epichlorohydrin printed circuit boards. It has been found that a cured bisphenol-A-epichlorohydrin epoxy treated in a manner revealed in U.S. Pat. 3,437,507, i.e., with chromic acid, gives adhesion values of only 3 lbs./in. for metallic patterns deposited thereon.

Another method, generally employed for plastics, such as A-B-S, comprises treating the plastic with an organic solven thereof. U.S. Pat. 3,425,946 reveals such a method with A-B-S plastic. However, what solvents are effective depend on the plastic employed and is therefore empirical in nature. Organic solvent pretreatment alone has been found to ineffectively raise the adherence of metallic patterns to cure epoxies such as the cured epoxies of bisphenol-A-epichlorohydrin. It has been found that a cured bisphenol-A-epichlorohydrin epoxy treated in this fashion exhibits an adhesion of 2 to 3 lbs./in., whereas as stated above, 5 lbs./in. is the minimum amount desired for printed circuit boards.

A solvent-etch technique has been employed to improve the adherence of deposited metals to A-B-S surface. U.S. 3,445,350; U.S. 3,479,160; and U.S. 3,142,581 reveal such a method. However, as explained above, A-B-S is a copolymer system, rich in one component, therefore, two different phases are present in the A-B-S. The employed solvent and etchant thereof attack different phases to give micro pores or cavities. The micro pores and cavities provide mechanical anchorage for an electroless metal layer or coating destined to be deposited on the surface of the A-B-S. The cured bisphenol A-epichlorohydrin epoxy resin, on the other hand, as indicated previously, is a polymer having a single phase. Therefore, one phase cannot be solvent treated and/or etched in preference to another phase to give micro pores since there is only one phase. A solvent-etch system which works for A-B-S could not therefore be deducibly said to work for an epoxy system.

A method of treating a cured epoxy surface which gives improved adherence with respect to selected deposited species thereupon, especially in aqueous form, is therefore needed. Also needed is a method of depositing a metal deposit on a cured epoxy surface whereby the metal deposit has a peel strength of at least 5 lbs./in.

SUMMARY OF THE INVENTION

The present invention is directed to a method of improving adhesive properties of an epoxy surface and more particularly, to improving adherence of a species to a surface of a cured epoxy resulting from an uncured bisphenol A-epichlorohydrin epoxy.

The method includes first exposing a cure epoxy surface, comprising a cured product resulting from curing the uncured bisphenol A-epichlorohydrin epoxy with a suitable curing agent, to a suitable swellant of the cured epoxy. A suitable swellant includes methyl ethyl ketone, tetrahydrofuran, dioxane, pyridine, dimethylformamide, and an alcohol mixture comprising methyl ethyl ketone, ethanol and methanol. The cured surface is exposed to the swellant for a period of time sufficient to swell the epoxy surface. The swelled epoxy surface is then exposed to an etchant for the cured epoxy, for a sufficient period of time to etch the swelled surface without unduly weakening or otherwise adversely affecting the physical characteristics of the epoxy. A preferred etchant comprises an aqueous solution of $H_2SO_4$, $H_3PO_4$, and $CrO_3$.

The resultant etched surface is now in a condition of improved adherence for any species, e.g., printing ink, aqueous solutions, metal deposits, etc., which may be deposited thereupon. For even greater improvement with respect to the adhesive characteristics, the resultant etched surface may be further treated so as to remove essentially all traces of the etchant and/or an etchant-epoxy material reaction product from the surface destined to be deposited upon.

DESCRIPTION OF THE DRAWINGS

The present invention will be more readily understood by reference to the following drawing taken in conjunction with the detailed description, wherein.

DETAILED DESCRIPTION

The present invention is described primarily in terms of improving adherence of a copper deposit, deposited from an electroless plating bath, upon a cured epoxy of bisphenol A-epichlorohydrin. However, it will be understood that such description is exemplary only and is for purposes of exposition and not for purposes of limitation.

It will be readily appreciated that the inventive concept described is equally applicable to improve adhesion between the cured epoxy and other conventional species which may be utilized in cementing printing and metalizing the epoxy.

Figure 1:
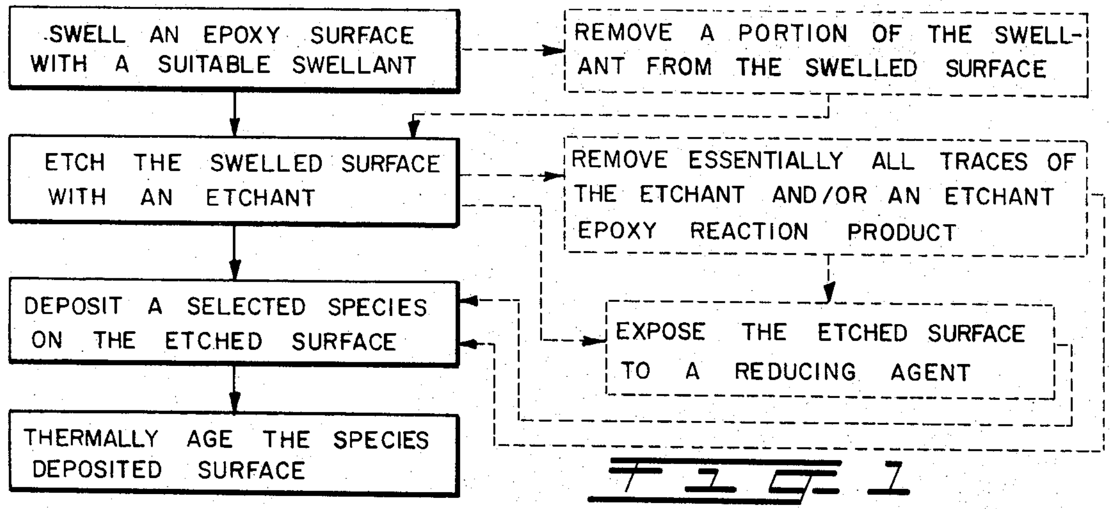
FIG. 1 is a general flow chart of the novel process of the invention.

With reference to the flow chart of FIG. 1, a cured epoxy is selected upon which a suitable species, aqueous or non-aqueous, is destined to be deposited. A suitable species may be any material, organic or inorganic, which is amenable of deposition upon a surface of the cured epoxy. Some typical suitable materials are water and/or organic solvent based paints, lacquers or inks, inorganic salts, adhesives, metals, plastics, etc. The cured epoxy typically comprises the product resulting from curing an uncured bisphenol A-epichlorohydrin with a curing agent. The uncured bisphenol A-epichlorohydrin has the general formula

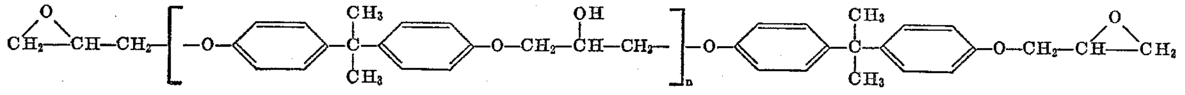

where $n$ is the number of repeated units in the resin chain. The uncured bisphenol A-epichlorohydrin resins are described in terms of their melting point, epoxide equivalent and equivalent weight. The epoxide equivalent is defined as the number of grams of resin containing one gram equivalent of epoxide. The equivalent weight is defined as the number of grams of resin required to esterify completely one gram mole of monobasic acid, such as for example, 60 grams of acetic acid.

Some suitable uncured bisphenol A-epichlorohydrin epoxy resins of interest are those having an epoxide equivalent ranging from about 450 to about 4,000. Some typical epoxies are commercially available epoxies designated as Epon® epoxies. Some of the Epon® epoxies are (1) Epon® 1001 which is a trademark product of Shell Chemical Company and which is an uncured epoxy having an epoxide equivalent of 450 to 525, an equivalent weight of 1,300 and a melting point ranging from 64° to 76° C., (2) Epon® 1007 which is a trademark product of Shell Chemical Company and which is an uncured epoxy having an epoxide equivalent of 1,550 to 2,000, an equivalent weight of 190 and a melting point ranging from 127° to 133° C., (3) Epon® 1009 which is a trademark product of Shell Chemical Company and which is an uncured epoxy having an epoxide equivalent of 2,400 to 4,000, an equivalent weight of 200 and a melting point ranging from 145° to 155° C., and (4) Epon® 1004 which is a trademark product of Shell Chemical Company and which is an uncured epoxy having an epoxide equivalent of 870 to 1,025, an equivalent weight of 175 and a melting point of 95° to 105° C.

The uncured bisphenol A-epichlorohydrin epoxy is first combined with a suitable curing agent, e.g., dicyandiamide, to form a mixture. Suitable curing agents are those well known in the art and are revealed in part and discussed in Epoxy Resins—Their Applications and Technology, H. Lee and K. Neville, McGraw-Hill Book Company, Inc. (1957). The mixture of uncured epoxy and curing agent is then heated under conditions of time and temperature whereby a fully cured bisphenol A-epichlorohydrin results. The curing conditions are well known in the art or are readily ascertainable experimentally. Generally, the amounts of a particular type of curing agent, and the time-temperature parameters for curing a bisphenol A-epichlorohydrin epoxy are given in part in Epoxy Resin—Their Applications and Technology. For dicyandiamide, a full cure is attained by using from about 16 to about 20 weight percent of the curing agent. By a full cure one means that the resultant cured bisphenol A-epichlorohydrin epoxy has been optimized to the extent possible with respect to electrical properties, mechanical properties and chemical resistance, i.e., with respect to criteria which are well known in the art and are easily ascertainable experimentally. In this regard, the various curing parameters and their interdependency are well known in the art, and their interaction between one another is also well known or can be easily ascertained experimetally by one skilled in the art.

A surface of the cured bisphenol A-epichlorohydrin epoxy, which is the reaction product of the uncured bisphenol A-epichlorohydrin and the curing agent, e.g., dicyandiamide, is exposed to a suitable swelling agent or penetrant for a period of time sufficient to swell regions of the epoxy surface. Swelling is defined as penetrating the epoxy in depth, by the swelling agent, without true dissolution thereof, and opening up or expanding in a spatial sense, the cross-linking network of the cured bisphenol A-epichlorohydrin epoxy. A suitable swelling agent or penetrant is any material which (1) is capable of swelling the cured epoxy, (2) is chemically unreactive with the cured epoxy, (3) is not a solvent for the epoxy, i.e., does not dissolve the epoxy to any discernible extent (within a 24-hour period), and (4) is miscible with water. A sufficient period of time is interdependent upon the swelling agent or penetrant employed, and the temperature at which the epoxy is exposed to the penetrant. These are all factors which are well known to the skilled in the art or are easily ascertainable experimentally.

Suitable swelling agents or penetrates for cured epoxies, including cured bisphenol A-epichlorohydrin epoxies resulting from a curing reaction between uncured bisphenol A-epichlorohydrin epoxies having epoxide equivalents within the range of from about 450 to about 4,000 and the curing agent, i.e., dicyandiamide, are methyl ethyl ketone, tetrahydrofuran, dioxane, pyridine, dimethylformamide an alcohol mixture comprising 95% by volume methyl ethyl ketone and 5% denatured alcohol (95% ethanol and 5% methanol) and mixtures thereof.

Typically the swelling exposure time to the above solvents ranges from 3 to 20 minutes at room temperature whereby the cured bisphenol A-epichlorohydrin epoxy is sufficiently swelled. A swelling time below 3 minutes at 25° C. leads to insufficient swelling of the cured epoxy surface and ultimately leads to an insufficiency with respect to an etching to which the cured epoxy surface is to be subjected and hence poor adhesion properties thereof. A swelling time above 20 minutes at 25° C. leads to a swelling excess, i.e., the cured epoxy is swelled or spatially expanded, with respect to its crosslinking networks to an intolerable degree. Since the amount of swelling is directly related to the degree and quality of the etch to which the epoxy is to be subjected, an excess amount of swelling leads to a much too vigorous subsequent etch and hence poor adhesive properties of the epoxy due to physical weakening thereof. A preferred swelling time at 25° C. ranges from 8 to 12 minutes for an optimum swelling and an optimum subsequent etching. It is, of course, understood that the exposure time to a particular solvent is interdependent on temperature and the time period given above for a temperature of 25° C. is exemplary only and is not limiting. The time-temperature parameters are easily ascertainable by one skilled in the art.

Referring to the flow chart of FIG. 1, the swelled, cured epoxy may next be subjected to a first optional step of removing excess swelling agent or penetrant from the cured epoxy surface. The removal may be effected by either rinsing the swelled epoxy with water or by air drying with or without circulating air. The excess penetrant removal step is desirable in order not to destroy the potency or life of an etchant to which the swelled epoxy is destined to be exposed. If the penetrant removal step is performed, too much penetrant cannot be removed from the swelled epoxy surface since, as stated above, the degree of swelling affects the etching to which the swelled epoxy is destined to be subjected. If too much penetrant is removed, the degree of swelling decreases and ultimately the effectiveness of the destined etching. Typically, for methyl ethyl ketone, the swelled epoxy can be air dried or rinsed in water, at a temperature of 25° C., for a period of time ranging from 15 seconds to one minute. It has been found that rinsing or drying beyond one minute may adversely affect peel strength. However, it is to be stressed that this excess penetrant removal step, although it is preferred in order to maintain the life of the etchant, is not essential to the present invention.

After the cured epoxy has been exposed to the swelling agent and perhaps rinsed with water to remove any excess of the swelling agent from the swelled epoxy surface, the swelled epoxy surface is exposed to a suitable etchant thereof at a suitable temperature, for a period of time sufficient to etch swelled sites. An adequate etching is typically evidenced by a pitted or roughened surface having pores or pits of $1\mu$ or less in diameter and 0.25 to $1.25\mu$ in depth. A suitable etchant is an etchant which will (1) etch the swelled, cured epoxy areas without unduly weakening the physical characteristics of the cured epoxy, and (2) preferentially etch the swelled sites or regions of the swelled, cured epoxy surface more rapidly than those regions which are not swelled or are in a less swelled condition. Suitable etchants for a cured bisphenol A-epichlorohydrin epoxy, including the cured reaction product of an uncured bisphenol A-epichlorohydrin epoxy having an epoxide equivalent ranging from about 450 to about 4,000, and 16 to 20 weight percent dicyanidiamide, are aqueous solutions of $H_2SO_4$, $CrO_3$, dichromate ($Cr_2O_7^{=}$) and mixtures thereof. However, a preferred suitable etchant for the swelled, cured bisphenol A-epichlorohydrin has been found to be an aqueous solution comprising $H_2SO_4$, $H_3PO_4$ and $CrO_3$. For an etching exposure within a temperature range of 21.1° to 43.3° C. (70° F. to 10° F.), the etching solution comprises a concentration of $H_2SO_4$ which ranges from 1 to 4 moles/liter of the etching solution. If the concentration of the $H_2SO_4$ is less than 1 molar, a peel strength of less than 5 lbs./in. is obtained with an electroless copper deposit on the cured bisphenol A-epichlorohydrin epoxy. If the concentration of the $H_2SO_4$ is greater than 4 molar, the resultant etch of the etching solution is too vigorous and the epoxy is physically weakened, thereby causing the bond strength to go down and thus leading to a peel strength of less than 5 lbs./in. for the electroless copper deposit. A preferred $H_2SO_4$ concentration is 184 grams/liter of the etching solution.

For etching the swelled, cured epoxy at a temperature ranging from 21.1° C. to 43.3° C. (70° F.–110° F.), the etching solution comprises a concentration of $H_3PO_4$ ranging from 2–5 moles/liter of etching solution. The role of $H_3PO_4$ is not known with exactitude, but it is hypothesized that it has a synergistic effect on the resultant etching solution due to its buffering and/or diluting effect. The $H_3PO_4$ appears to buffer and reduce the vigor of the attack of the etchant or etching solution on the swelled, cured epoxy and maintain the resulting etching on a constant and desired level. A preferred concentration of the $H_3PO_4$ in the etching solution, which is used at the temperature ranging from 21.1° C. to 43.3° C. is 250 grams/liter of the etching solution.

For etching the swelled, cured epoxy at the temperature range of 21.1° C. to 43.3° C., the etching solution comprises a $CrO_3$ concentration ranging from at least 200 grams/liter of etching solution to saturation of the etching solution at the particular temperature. A preferred concentration of $CrO_3$ in the etching solution, which is used within the above temperature range is 368 grams/liter of the etching solution.

The manner in which the etchant solution is prepared affects the adhesive properties of the cured epoxy. It has been found that the adhesive properties of the epoxy are optimized by preparing the etchant solution so that the $CrO_3$ is first added to water and is then heated, typically to a temperature in the range of 70° C. to 80° C. for about 20 minutes, whereafter the $H_3PO_4$ and the $H_2SO_4$ are added to form the etchant solution. In this regard it is to be understood that the time-temperature parameters for heating the combined $CrO_3$ and water are interdependent. This interdependency is one which is well known in the art or can be easily ascertained experimentally.

It has been hypothesized that the optimum adhesion results which are obtained, through the use of the etchant solution prepared in te above-described manner, are due to a formation of $Cr_2O_7^{=}$ ions when the $CrO_3$ is heated in the presence of water. This hypothesis is strengthened by the fact that similar results can be achieved, without heating, by adding small catalytic amounts, typically 1 to 2 grams/liter of etchant, of dichromate, e.g., $Na_2Cr_2O_7$, $K_2Cr_2O_7$, to the etching solution comprising $H_2SO_4$, $H_3PO_4$ and $CRO_3$. It is, of course, understood that although the etchant solutions prepared by either heating the aqueous $CRO_3$ solution or by adding $Cr_2O_7^{=}$ to the resultant mixture of $H_2SO_4$, $H_3PO_4$ and $CrO_3$ are preferred, improved adhesion properties of the cured epoxy are also obtained by other methods of preparing the etchant, although the degree of improvement may not be optimal.

The ambient temperature of the etchant solution dramatically affects the adhesive properties of the cured epoxy. It is, of course, understood that the temperature of the etching solution may vary over a broad spectrum, typically from 20° C. to the boiling point of the etching solution. However, a preferred temperature range is 21.1° C. to 43.3° C. (70° F. to 110° F.). A sufficient period of time for etching the swelled, cured epoxy without weakening the swelled surface region thereof typically ranges from 4 to 14 minutes at the preferred temperature (ranging from 21.1 to 43.3° C.) and the etchant constituent concentrations given above. Beyond 14 minutes, the surface of the cured epoxy may degrade physically, e.g., become powdery, or otherwise be damaged, thereby lowering the adhesive properties or adhesive bond strength thereof. Below a 4 minute exposure of the swelled, cured epoxy to the etchant, at a temperature of 21.1 to 43.3° C., the etching or roughening of the surface is insufficient and causes poor adhesion. A preferred period of time ranges from 9 to 11 minutes. It is to be understood and stressed that the above concentration, temperature and time parameters are all interdependent and that variations in temperature will produce variations in the other parameters whereby optimum results will be attained. In this regard, the various parameters and their interdependency are well known in the art and their interaction between one another is also well known in the art and their interaction between one another is also well known or can be easily ascertained experimentally by one skilled in the art.

Referring to the flow chart of FIG. 1, a second optional step may now be performed on the etched epoxy. The optional step is a removal of essentially all traces of a deposit, residing on the etched epoxy surface, from the surface of the epoxy. The deposit comprises the etchant and/or an etchant-epoxy material reaction product which forms, e.g., oxidized or degraded epoxy material. The removal may be best accomplished by rinsing the etched epoxy with water (preferably deionized water) for approximately one minute. In this regard, it is to be noted that the rinsing may extend beyond one minute since there is no adverse effect from long duration rinsing with water. It is also to be understood that the removal step may involve in whole or in part a mechanical moval step may involve in whole or in part a mechanical removal, e.g., by a doctor blade removal of the etchant and/or etchant-epoxy reaction product which forms or remains on the surface of the etched epoxy. It is again to be understood and stressed that although the removal step is a preferred step, especially where an electroless metal deposit is destined to be deposited on the etched epoxy surface, where traces of the etching solution and/or etchant-epoxy reaction product can be tolerated on the surface of the etched epoxy, this removal step may be eliminated.

A third optional step may now be performed on the etched epoxy either directly from the etching thereof or after the deposit removal step, if performed. This third optional step comprises exposing the etched surface to a reducing agent whereby $Cr^{+6}$ ions which are present are reduced to $Cr^{+4}$ ions. The reducing agent may be any suitable reducing agent for $Cr^{+6}$ ions which are well known in the art to one skilled therein. A typical suitable reducing agent is $Na_2SO_3$, contained in a suitable carrier medium, e.g., water. The etched, cured epoxy surface is immersed in a solution, e.g., an aqueous solution, of the reducing agent for a period of time sufficient to reduce essentially all $Cr^{+6}$ ions present on the etched epoxy surface or absorbed into the interior of the cured epoxy.

Typically, the exposure to the reducing agent is from 30 seconds to 2 minutes at a temperature ranging from 25° C. to 70° C. In this regard, it is to be understood that the time-temperature parameters above are illustrative only and that the time-temperature parameters are interdependent and may be varied to obtain optimum results. Again it is to to be pointed out that the interrelationship between time and temperature is well known in the art or can be easily ascertained by one skilled in the art. Also, it is again to be understood and stressed that where $Cr^{+6}$ ions can be tolerated on the surface or in the interior of the cured epoxy, this reduction step may be eliminated.

A suitable species is then deposited on the etched epoxy surface which may or may not have traces of the etchant and/or etchant-cured epoxy reaction product or $Cr^{+6}$ ions thereon. A suitable species may be any of a multitude of materials well known in the art which can be deposited upon a cured epoxy surface and comprises in part conventional aqueous or organic based paints, lacquers, inks and adhesives, aqueous or non-aqueous solutions of inorganic salts, aqueous or non-aqueous electroless metal deposition solutions and the metal deposits resulting therefrom, metals, etc. The suitable species may be deposited or applied to the etched epoxy surface by any standard means known in the art including dipping, brushing, spray coating, spin coating, vapor depositing, electroless depositing with or without electrodepositing, sputtering, etc.

Figure 2:
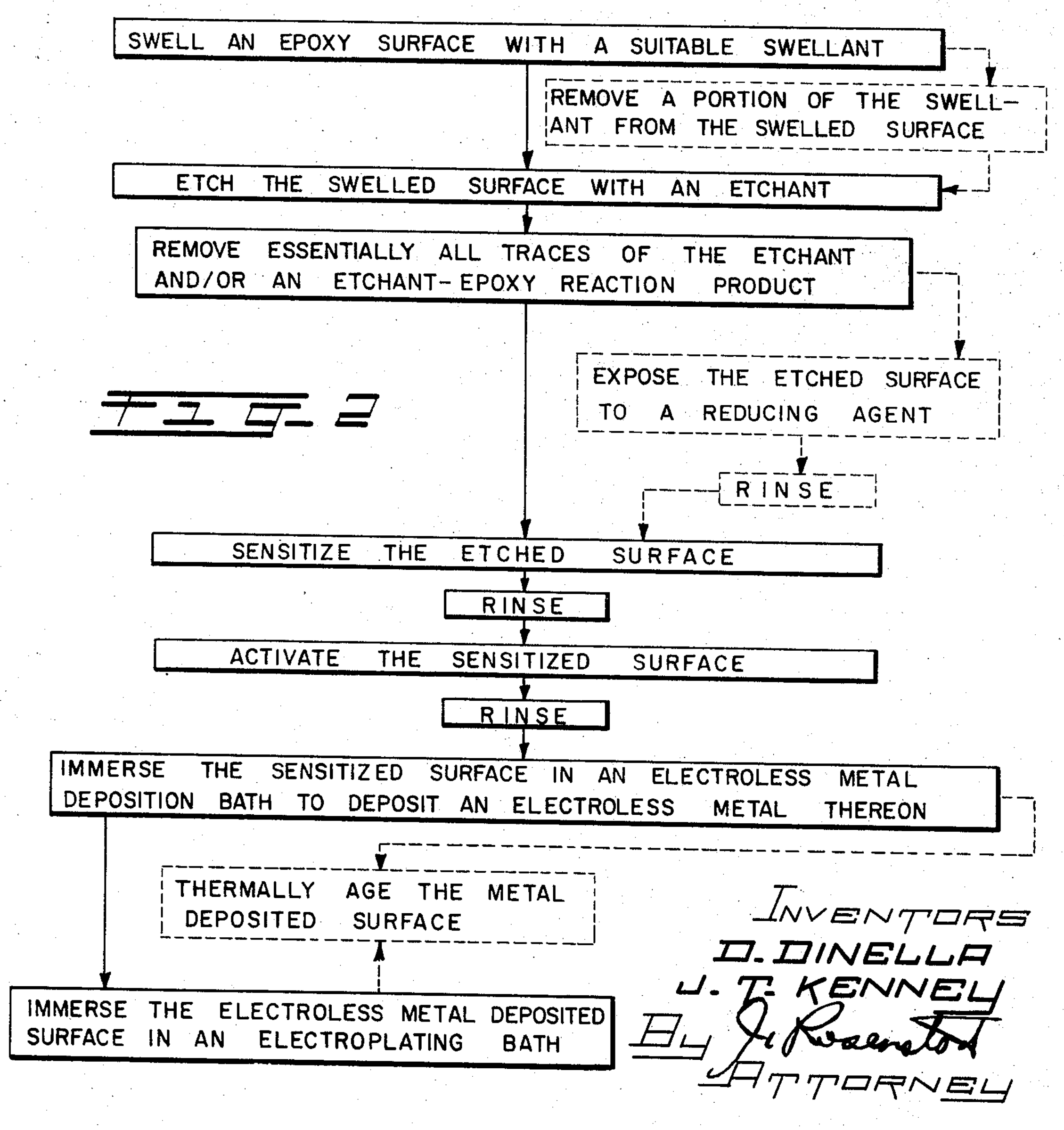
FIG. 2 is a flow chart of the process of the invention directed to an electroless metal deposition.

The selected species-deposited, cured epoxy surface is then thermally aged or post baked for a period of time sufficient to insure adequate adhesion of the selected species to the cured epoxy surface, e.g., an adequate adhesion typically being represented by a metal deposit (electroless and electro) evidencing a peel strength of at least 5 lbs./in. The thermal aging typically may be at a temperature of 110° C. to 230° C. for 15 to 60 minutes. Again, it is to be understood and stressed that the above temperature and time parameters are all interdependent and that variations in temperature will produce variations in the other parameters whereby optimum results will be attained. In this regard, the time-temperature adhesion parameters are well known in the art and their interaction between one another is also well known or can be easily ascertained experimentally by one skilled in the art.

Where the selected species is an electrolessly deposited metal, a standard electroless technique may be employed. A typical standard method of electroless deposition is outlined in the flow sheet of FIG. 2. It is of course understood that any conventional electroless metal deposition technique may be employed and the outline in FIG. 2 is illustrative only and not restrictive. The swelled and subsequently etched epoxy surface is thoroughly rinsed with water (deionized) or any other suitable cleaning agent to remove essentially all traces of the etchant and/or etchant-epoxy material reaction product. Proper rinsing is essential in order to remove essentially all traces of the etchant from the etched cured epoxy surface as well as any etchant epoxy reaction product which may form, so as not to contaminate a sensitizing, an activating and an electroless plating solution to which the etched surface is destined to be subjected. Contamination, particularly of the plating bath, is undesirable because the stability of such plating baths is frequently adversely affected by such a condition.

After rinsing, the etched, cured epoxy may be exposed to a suitable reducing agent to reduce essentially all $Cr^{+6}$ ions present, whereafter the etched epoxy is rinsed again thoroughly with water, which as discussed above, is essential to prevent contamination. The etched epoxy surface is then sensitized. Sensitization consists of depositing or absorbing on the etched surface a sensitizing species, e.g., $Sn^{+2}$ ions, which is readily oxidized. Conventionally, the cleaned and etched surface is dipped into a standard sensitizing solution, e.g., aqueous stannous chloride with a supporting medium such as HCl, ethanol, ethanol and caustic, or ethanol and hydroquinone. It is to be understood that the sensitizing solutions and the conditions and procedures of sensitizing are well known in the art and will not be elaborated herein. Such sensitizers and procedures may be found, in part, in Metallic Coating of Plastics, William Goldie, Electrochemical Publications, 1968.

After sensitizing the etched epoxy surface, the sensitized surface is rinsed, then activated. It is to be noted that it is important that the sensitized surface be rinsed thoroughly in a cleaning medium, e.g., deionized water, after sensitizing. If such is not done, there is a possibility that excess sensitizer on the roughened surface will cause reduction of an activating species, e.g., $Pd^{+2}$, to which the sensitized surface is destined to be exposed, in non-adherent form on the etched surface. Activation relates to providing a deposit of a catalytic metal, e.g., Pd, over the etched surface of the epoxy polymer, in sufficient quantities to successfully catalyze a plating reaction once the etched surface is introduced into an electroless plating bath. The sensitized surface is exposed to a solution containing the activating species, e.g., a noble metal ion, wherein the sensitizing species is readily oxidized and the noble metal ion, e.g., $Pd^{+2}$, is reduced to the metal, e.g., Pd, which in turn is deposited on the etched epoxy surface. The deposited activating metal, e.g., Pd, acts as a catalyst for localized further plating. Again, it is to be understood that the various activating metal ions and their solutions, the conditions and procedures of activation are well known in the art and will not be elaborated herein. Such activators and procedures may be found, in part, in Metallic Coating of Plastics, previously referred to.

After the activating step, the activated epoxy surface is rinsed with deionized water and then immersed in a standard electroless plating bath containing a metal ion, e.g., $Cu^{++}$, destined to be reduced by the catalytic metal species, e.g., Pd. The metal ion, e.g., $Cu^{++}$, is reduced by the catalytic metal, e.g., Pd, and is electrolessly deposited on the polymeric surface. Again it is to be pointed out that the electroless baths, the electroless plating conditions and procedures are well known in the art and will not be elaborated herein. Reference is again made to Metallic Coating of Plastics, previously referred to, for some typical examples of electroless baths and plating parameters. It is to be noted that in some cases, it is possible to combine the sensitizing and activating step into one step. The electroless metal-deposited, cured epoxy surface is then thermally aged, e.g., at 110° to 230° C. for 15 to 60 minutes whereby an adherent electroless metal deposit is attained. It is to be noted that the electroless metal deposit may be subjected to a conventional electroplating treatment whereby it is built up. In such a situation, it is, of course, understood that there may be an additional thermal aging or post bake or just one thermal aging, after the final electroplating treatment.

Figure 3:
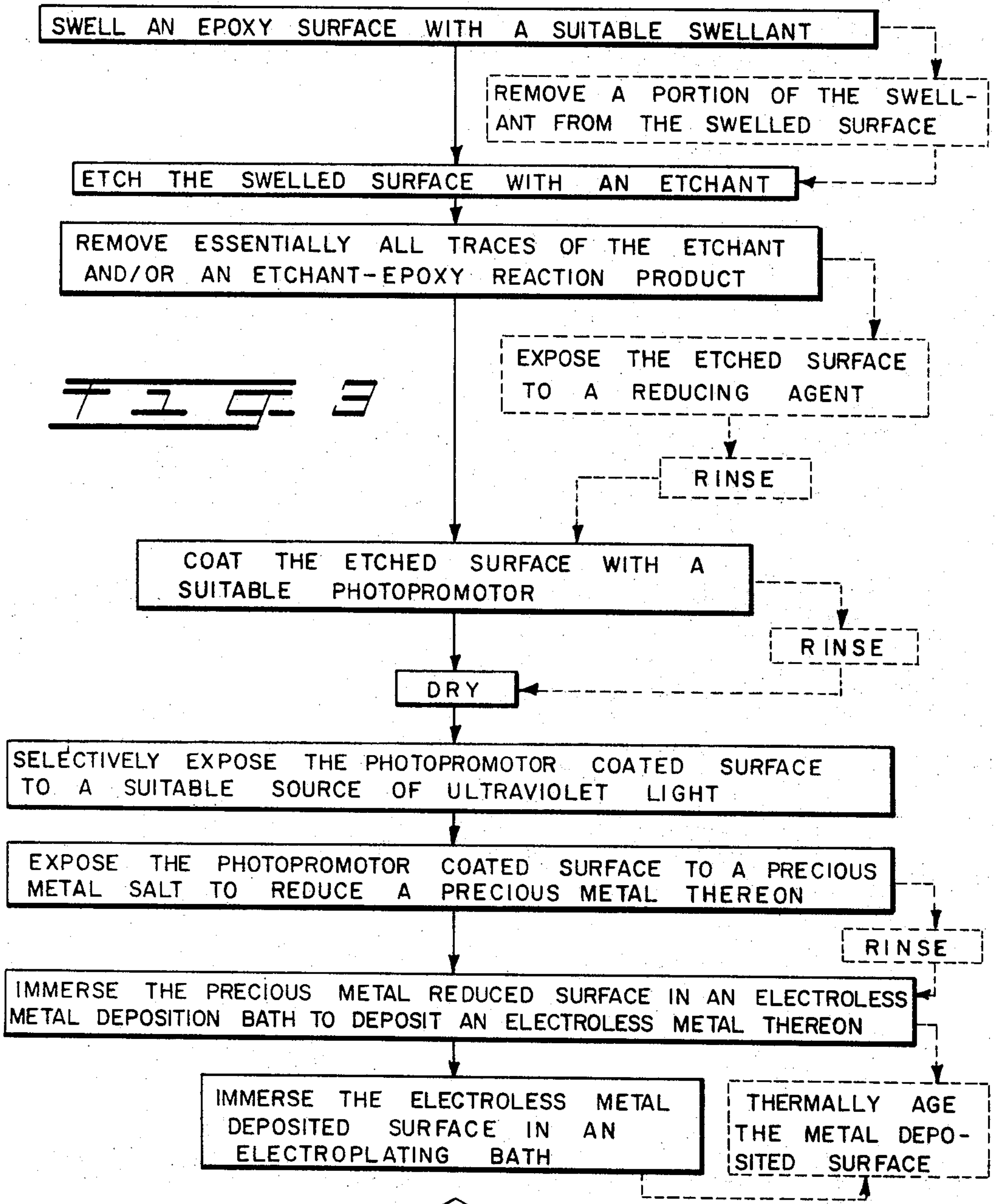
FIG. 3 is a flow chart of the process of the invention directed to a photosensitive electroless metal deposition.

A preferred method of electrolessly depositing a metal on the resultant etched epoxy surface is the method revealed in De Angelo et al., Ser. No. 719,976, filed Apr. 9, 1968, and now Pat. No. 3,562,005, assigned to the assignee hereof and incorporated by reference hereinto. Referring to FIG. 3, the method entails applying a photopromoter solution to the surface resulting from the swelling and etching of the cured epoxy utilizing procedures revealed in M. A. De Angelo et al. It is to be noted that the etched epoxy surface is treated, prior to the photopromoter coating, so as to remove a portion of the deposit, representing essentially all traces of the etching solution and/or etchant-epoxy material reaction product, from the surface followed by a thorough rinsing thereof. Also, essentially all traces of $Cr^{+6}$ may be reduced as discussed above. A photopromoter is defined as a substance which, upon being exposed to appropriate radiation, either (a) dissipates chemical energy already possessed thereby, or (b) stores chemical energy not prenot previouslyviously possessed thereby. When the substance possesses or has stored chemical energy it is capable of promoting, other than as a catalyst, a chemical reaction whereby it, the photopromoter, undergoes a chemical change in performing its function) unlike a catalyst). The resultant photopromoter-covered, cured epoxy surface may then be rinsed with dionized water (depending on the type of photopromoter employed) and is then dried. The photopromoter coated surface is then selectively exposed to a source of ultraviolet radiation, through a suitable mask, to form at least one region which is capable of reducing a precious metal from a precious metal salt, e.g., $PdCl_2$. The region so capable is exposed to the precious metal salt, e.g., $PdCl_2$, whereby the precious metal salt is reduced to the precious metal, e.g., Pd, which in turn is deposited thereon.

The precious metal deposited region is then exposed to a suitable electroless metal plating bath, e.g., copper wherein the metal, e.g., copper, is plated on the region forming an adherent metal deposit on the previously swelled and etched, cured epoxy surface. The electroless metal-deposited epoxy surface is then thermally aged or post-baked, e.g., typically at 110° to 230° C. for 15 to 60 minutes, whereby an adherent electroless metal deposit is attained. It is to be noted that the electroless metal deposit may be subjected to a conventional electroplating treatment whereby the electroless metal deposit is built up. In such a situation, it is again to be understood that there may be an additional thermal aging or just one thermal aging, after the electroplating treatment.

A suitable photopromoter solution may be either a positive type or a negative type as discussed in M. A. De Angelo et al. A suitable mask, either positive or negative depending on whether the photopromoter is positive or negative, is one as discussed in De Angelo et al., and typically comprises a quartz body having a radiation opaque pattern thereon. The ultraviolet radiation source is a source of short wavelength radiation (less than 3,000 A., typically about 1,800 A. to about 2,900 A.).

EXAMPLE I

Figure 4:
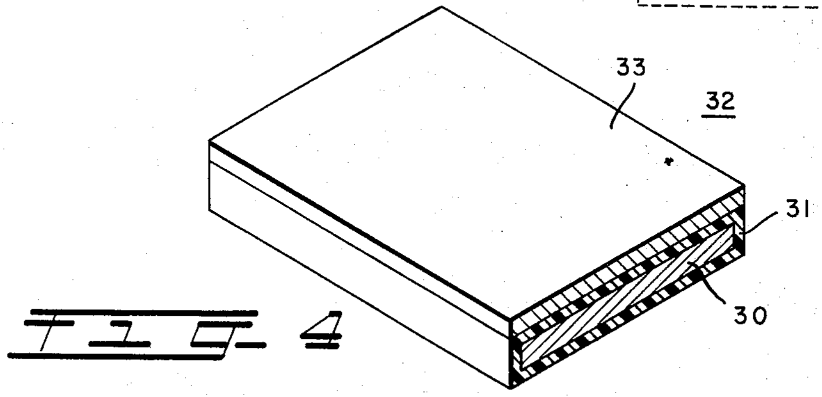
FIG. 4 is a perspective view of an epoxy coated substrate plated with an electroless metal deposit utilizing the process of the invention.

Referring to FIG. 4, a plate 30 of mild steel, commercially obtained, was preheated to a temperature of 500° F. The plate 30 was then immersed in a standard fluidized bed chamber containing aerated powder comprising (1) a commercially obtained melted mixture of two solid epoxy resins obtained by interacting bisphenol A with epichlorohydrin having an epoxide equivalent in the range of 450 to 4,000, and (2) a dicyandiamide catalyst (about 16 weight percent). As the individual particles of the powder impinged upon the heated plate 30, they fused and adhered to the surfaces thereof to form a continuous film 31 comprising the mixture of uncured epoxies and dicyandiamide. The film-coated plate 30 was then removed from the fluidized bed chamber and post-heated at a temperature of 460° F. for 15 minutes to fully cure the resultant mixture of bisphenol A-epichlorohydrin epoxies to form a cured epoxy-coated substrate 32.

The substrate 32 with the now fully cured epoxy layer 31 thereon was then subjected to a swelling treatment. The cured epoxy-coated substrate 32 was immersed in a solvent bath comprising methyl ethyl ketone. The solvent bath was maintained at 25° C. and the time of immersion was ten minutes. The swelled, cured epoxy coated substrate 32 was then rinsed with water for one minute.

An etching solution was prepared by first adding 368 grams of $CrO_3$ to 80 ml. of water and heating the resultant solution to 70° C. whereafter 250 grams of $H_3PO_4$ was added. The mixture was then heated to a temperature of 80° C. and 188 grams of 98 weight percent $H_2SO_4$ was added. Crystals formed and 200 ml. of water was then added and the mixture was heated until the crystals dissolved. The resultant etching solution was cooled and water was added thereto to make up a volume of 1 liter.

The swelled, cured epoxy coated substrate 32 was then immersed in the resultant etching solution, maintained at 25° C., for a period of 10 minutes whereby the swelled cured epoxy film 31 was etched. After etching, the epoxy-coated substrate 32 was rinsed in water, at 25° C., for two minutes followed by a one minute rinse in 0.1 molar HCl to remove essentially all traces of residual etching solution and any degraded epoxy which may have formed from the surfaces of the resultant etched, cured epoxy-coated substrate 32. The etched, epoxy-coated substrate 32 was then rinsed in deionized water (for two minutes) to prevent contamination of a sensitizing solution, comprising 1 weight percent $SnCl_4$ and 0.5 weight percent $SnCl_2 \cdot 2H_2O$ into which the etched substrate 32 was immersed at a temperature of 25° C. for 1 minute. The sensitized substrate was then immersed in a 0.01 molar aqueous $PdCl_2$ solution for two minutes, at 25° C., forming reduced metal, i.e., Pd on the surfaces of the etched substrate 32. The substrate 32 was then immersed in an electroless copper plating bath, commercially obtained to form a 2-mil copper deposit 33 on the surfaces of substrate 32.

The copper-deposited substrate 32 was then subjected to a commercial bond strength testing apparatus whereby the copper deposit had an adhesion of 7–8 lbs./in. (90° peel at a peel rate of 2 in./min.).

EXAMPLE II

The procedure of Example I was repeated except that the immersion time in the swellant was 8 minutes. The adhesion of the resultant copper deposit was 5 lbs./in.

EXAMPLE III

The procedure of Example I was repeated except that the immersion time in the swellant was 9 minutes. The adhesion of the resultant copper deposit was 6 lbs./in.

EXAMPLE IV

The procedure of Example I was repeated except that the immersion time in the swellant was 11 minutes. The adhesion value obtained was 6.5 lbs./in.

EXAMPLE V

The procedure of Example I was repeated except that the immersion time in the swellant was 12 minutes. The adhesion value was 6.0 lbs./in.

EXAMPLE VI

The procedure of Example I was repeated except that the immersion time in the etchant was 6 minutes. The adhesion value was 5.0 lbs./in.

EXAMPLE VII

The procedure of Example I was repeated except that the immersion time in the etchant was 8 minutes. The adhesion value was 6.0 lbs./in.

EXAMPLE VIII

The procedure of Example I was repeated except that the immersion time in the etchant was 12 minutes. The adhesion value was 6.5 lbs./in.

EXAMPLE IX

The procedure of Example I was repeated except that the immersion time in the etchant was 14 minutes. The adhesion value was 6.0 lbs./in.

EXAMPLE X

The procedure of Example I was repeated except that the swelling agent was tetrahydrofuran. The immersion time in the tetrahydrofuran was 4 minutes. The immersion time in the etchant was 5 minutes. The adhesion value was 6 to 7 lbs./in.

EXAMPLE XI

The procedure of Example I was repeated except that the swelling agent was dioxane. The immersion time in the dioxane was 3 minutes. The immersion time in the etchant was 4 minutes. The adhesion was 5 to 6 lbs./in.

EXAMPLE XII

The procedure of Example I was repeated except that the swelling agent was pyridine. The immersion time in the pyridine was 5 minutes. The immersion in the etchant was 5 minutes. The adhesion was 6 to 7 lbs./in.

EXAMPLE XIII

The procedure of Example I was repeated except that the swellant was dimethylformamide. The immersion time in the dimethylformamide was 6 minutes. The immersion time in the etchant was 6 minutes. The adhesion was 5 lbs./in.

EXAMPLE XIV

The procedure of Example I was repated except that the swellant was an alcohol solution comprising 95% by volume methyl ethyl ketone and 5% by volume of denatured alcohol (95% ethanol, 5% methanol). The immersion time in the alcohol solution was 10 minutes. The immersion time in the etchant was 10 minutes. The adhesion was 7 lbs./in.

It is to be understood that the above-described embodiments are simply illustrative of the principles of the invention. Various other modifications and changes may be devised by those skilled in the art which will embody the principles of the invention and fall within the spirit and scope thereof.

What is claimed is:

1. In a method of improving adhesive properties of a fully cured epoxy surface, cured to an extent that leaves it still capable of being swelled, to a metal deposited thereon, said epoxy resulting from curing a composition comprising an uncured bisphenol A-epichlorohydrin epoxy which comprises:

(a) exposing the cured epoxy surface to a suitable swellant selected from the group of swellants consisting of methyl ethyl ketone, tetrahydrofuran, dioxane, pyridine, dimethylformamide, an alcohol mixture comprising (1) methyl ethyl ketone, (2) ethyl alcohol, and (3) methyl alcohol, and mixtures thereof, to swell the cured epoxy surface; and (b) exposing said swelled surface to an etchant for the cured epoxy comprising a solution of $H_2SO_4$, or $Cr^{+6}$ ions, and $H_3PO_4$ to etch said swelled surface.

2. The method as defined in claim 1, wherein:

in step (b) said exposure was at a temperature ranging from 70° to 110° F.; and said solution comprised $H_2SO_4$ in a concentration ranging from 1 to 4 moles/liter of etchant, $H_3PO_4$ in a concentration ranging from 2 to 5 moles/liter of etchant and $Cr^{+6}$, added as $CrO_3$ in a concentration ranging from a minimum of at least 200 grams/liter of etchant to saturation of said etchant solution at a particular temperature.

3. A method of improving adherence of a metal deposit to a fully cured epoxy surface, cured to an extent that leaves it still capable of being swelled, resulting from curing a composition comprising an uncured bisphenol A-epichlorohydrin epoxy, which comprises:

(a) exposing the cured epoxy surface to a suitable swellant selected from the group of swellants consisting of methyl ethyl ketone, tetrahydrofuran, dioxane, pyridine, dimethylformamide, an alcohol mixture comprising methyl ethyl ketone, ethyl alcohol and methyl alcohol, and mixtures thereof, to swell the cured epoxy surface;

(b) exposing said swelled surface to an etchant thereof comprising a solution of $H_2SO_4$, $Cr^{+6}$ ions, and $H_3PO_4$ to etch said swelled surface; and (c) depositing the metal on said etched surface.

4. The method as defined in claim 3, wherein:

in step (b) said exposure was at a temperature ranging from 70° to 110° F.; and said solution comprised $H_2SO_4$ in a concentration ranging from 1 to 4 moles/liter of etchant, $H_3PO_4$ in a concentration ranging from 2 to 5 moles/liter of etchant and $Cr^{+6}$, added as $CrO_3$ in a concentration ranging from a minimum of at least 200 grams/liter of etchant to saturation of said etchant solution at a particular temperature.

5. The method as defined in claim 3 which further comprises, prior to step (c), treating said etched surface with a suitable reducing agent to reduce $Cr^{+6}$ ions present.

6. The method as defined in claim 3 which further comprises thermally aging said metal deposited surface.

7. In an improved method of improving adherence of a metal deposit to a surface of a fully cured epoxy, cured to an extent that leaves it still capable of being swelled, said cured epoxy resulting from curing a composition comprising an uncured bisphenol A-epichlorohydrin epoxy, which comprises the steps of:

(a) sensitizing the surface to form a sensitized surface;

(b) activating the sensitized surface to form an activated surface; and (c) exposing the activated surface to a suitable electroless bath to deposit an electroless metal thereon, the improvement comprising:

($a^1$) prior to step (a) above, exposing the cured epoxy surface to a suitable swellant selected from the group of swellants consisting of methyl ethyl ketone, tetrahydrofuran, dioxane, pyridine, dimethylformamide, an alcohol mixture comprising (1) methyl ethyl ketone, (2) ethyl alcohol, and (3) methyl alcohol, and mixtures thereof, to swell the cured epoxy surface;

($b^1$) exposing said swelled surface to an etchant for the cured epoxy comprising a solution of $H_2SO_4$, $Cr^{+6}$ ions, and $H_3PO_4$ to etch said swelled surface; and ($c^1$) thermally aging said electroless metal deposited surface.

8. The method as defined in claim 7, wherein in step ($b^1$) said exposure was at a temperature ranging from 70° F. to 110° F. with a solution comprising $H_2SO_4$ in a concentration ranging from 1 to 4 moles/liter of etchant, $H_3PO_4$ in a concentration ranging from 2 to 5 moles/liter of etchant and $Cr^{+6}$ added as $CrO_3$ in a concentration ranging from a minimum of at least 200 grams/liter of etchant to saturation of said etchant solution at a particular temperature.

9. The method as defined in claim 7 wherein:

in step (b) said exposure was at a temperature ranging from 70° to 110° F. with a solution comprising $H_2SO_4$ in a concentration ranging from 1 to 4 moles/liter of etchant, $H_3PO_4$ in a concentration ranging from 2 to 5 moles/liter of etchant, $CrO_3$ added in a concentration ranging from a minimum of at least 200 grams/liter of etchant to saturation of said etchant solution at a particular temperature and $Cr_2O_7^{=}$ ions present in a catalytic amount.

10. The method as defined in claim 7 which further comprises, prior to step (a), treating said etched surface with a suitable reducing agent to reduce $Cr^{+6}$ ions present.

11. In an improved method of producing an adherent metallic pattern on a surface of a substrate comprising a fully cured epoxy, cured to an extent that leaves it still capable of being swelled, said fully cured epoxy resulting from curing a composition comprising an uncured bisphenol A-epichlorohydrin epoxy, which comprises the steps of:

(a) coating the surface with a photopromoter;

(b) producing a pattern capable of reducing a precious metal from a precious metal salt by selectively exposing a portion of the photopromoter coated surface to a source of short wavelength ultraviolet light;

(c) immersing the substrate in a precious metal salt solution to reduce on the pattern the precious metal; and then (d) placing the precious metal pattern in an electroless plating bath which is catalyzed by the reduced precious metal to produce the metallic pattern, the improvement comprising:

($a^1$) prior to step (a) above, exposing the cured epoxy surface to a suitable swellant selected from the group of swellants consisting of methyl ethyl ketone, tetrahydrofuran, dioxane, pyridine, dimethylformamide, an alcohol mixture comprising (1) methyl ethyl ketone, (2) ethyl alcohol, and (3) methyl alcohol, and mixtures thereof, to swell the cured epoxy surface;

($b^1$) exposing said swelled surface to an etchant for the cured epoxy comprising $H_2SO_4$, $Cr^{+6}$ ions, and $H_3PO_4$ to etch said swelled surface; and ($c^1$) thermally aging said metallic pattern deposited surface.

12. The method as defined in claim 11, wherein:

in step ($b^1$) said exposure was at a temperature ranging from 70° to 110° F. with a solution comprising $H_2SO_4$ in a concentration ranging from 1 to 4 moles/liter of etchant, $H_3PO_4$ in a concentration ranging from 2 to 5 moles/liter of etchant and $Cr^{+6}$ added as $CrO_3$ in a concentration ranging from a minimum of at least 200 grams/liter of etchant solution to saturation of said etchant solution at a particular temperature.

13. The method as defined in claim 11 wherein:

in step ($a^1$) said swellant comprised methyl ethyl ketone and said exposure was from 8 to 12 minutes at 25° C.; and in step ($b^1$) said etchant comprised an aqueous solution comprising 184 grams of $H_2SO_4$, 250 grams of $H_3PO_4$ and $Cr^{+6}$ added as $CrO_3$ in a concentration of 368 grams $CrO_3$ per liter of etching solution, and said exposure was from 9 to 11 minutes at a temperature of 35° C.

14. The method as defined in claim 11 wherein:

in step ($a^1$) said swellant comprised a mixture comprising (1) 95% by volume methyl ethyl ketone, and (2) 5% by volume of a mixture comprising 95% by volume ethyl alcohol and 5% by volume methyl alcohol and said exposure was from 9 to 11 minutes at 25° C.; and in step ($b^1$) said etchant comprised an aqueous solution comprising 184 grams of $H_2SO_4$, 250 grams of $H_3PO_4$, and $Cr^{+6}$ added as $CrO_3$ in a concentration of 368 grams of $CrO_3$ per liter of etching solution and said exposure was from 9 to 11 minutes at a temperature of 35° C.

15. A method of improving adherence of a deposited metal to a fully cured epoxy surface, cured to an extent that leaves it still capable of being swelled, resulting from curing a composition comprising an uncured bisphenol A-epichlorohydrin epoxy, which comprises:

(a) exposing the cured epoxy surface to a suitable swellant selected from the group of swellants consisting of methyl ethyl ketone, tetrahydrofuran, dioxane, pyridine, dimethylformamide, an alcohol mixture comprising methyl ethyl ketone, ethyl alcohol and methyl alcohol, and mixtures thereof, to swell the cured epoxy surface;

(b) preparing an etching solution by (1) adding $CrO_3$ to water to form an acid solution, (2) heating said acidic solution, and (3) adding $H_3PO_4$ and $H_2SO_4$ to said heated solution to form said etching solution;

(c) exposing said swelled surface to said etching solution to etch said swelled surface;

(d) depositing the metal on said etched surface; and (e) thermally aging said metal deposited surface.

16. The method as defined in claim 15, wherein:

in step (b), $CrO_3$ was added to water in an amount which gives a concentration ranging from a minimum of at least 200 grams/liter of etching solution to saturation of said etching solution at a particular temperature, $H_3PO_4$ was added in an amount which gives a concentration ranging from 2 to 5 moles/liter of etching solution and $H_2SO_4$ was added in an amount which gives a concentration ranging from 1 to 4 moles/liter of etching solution.

17. The method as defined in claim 16, wherein:

in step (a) said exposure was from 3 to 20 minutes at a temperature of 25° C.;

in step (b) 368 grams of $CrO_3$/liter of etching solution was added, 250 grams of $H_3PO_4$/liter of etching solution was added, and 154 grams of $H_2SO_4$/liter of etching solution was added; and in step (c) said exposure ranged from 4 to 14 minutes at a temperature ranging from 70° to 110° F.

References Cited

UNITED STATES PATENTS

| | | | |
|---|---|---|---|
| 3,033,703 | 5/1962 | Schneble et al. | 117—47 A |
| 3,560,241 | 2/1971 | Davis et al. | 117—47 A |
| 3,650,859 | 3/1972 | D'Ottavio | 156—2 |

JACOB H. STEINBERG, Primary Examiner

U.S. Cl. X.R.

117—130 E, 160 E; 156—2; 260—832

UNITED STATES PATENT OFFICE
CERTIFICATE OF CORRECTION

Patent No. 3,758,332 Dated September 11, 1973

Inventor(s) Donald Dinella et al

It is certified that error appears in the above-identified patent and that said Letters Patent are hereby corrected as shown below:

In the specification, column 3, lines 22-23, "acrylonitrilebuta-diene-" should read --acrylonitrile-butadiene- --; line 26, "systerm" should read --system--; line 39, "solven" should read --solvent--; line 45, "cure" should read --cured--; line 52, "surface" should read --surfaces--. Column 4, line 9, "cure" should read --cured--. Column 5, lines 36-37, "Epoxy Resins - Their Application and Technology" should read --Epoxy Resins - Their Application and Technology--; lines 45-46, "Epoxy Resins - Their Application and Technology" should read --Epoxy Resins - Their Application and Technology--. Column 6, line 3, "to the" should read --to one--; line 5, "penetrates" should read --penetrants--; line 10, "i.e." should read --e.g.--; line 12, "dimethylformamide" should read --dimethylformamide,--; line 15, "Typically" should read --Typically,--. Column 7, line 13, "10°F" should read --110°F--; line 35, "maintain" should read --maintains--; line 62, "in te" should read --in the--; line 70, "$CRO_3$" should read --$CrO_3$--; line 72, "$CRO_3$" should read --$CrO_3$--. Column 8, lines 29-31, "well known in the art and their interaction between one another is also well known or can" should read --well known or can--; lines 47-48, "mechanical moval step may involve in whole or in part a mechanical removal," should read --mechanical removal,--. Column 10, lines 1-2, "Metallic Coating of Plastics" should read --Metallic Coating of Plastics--; line 28, "Metallic Coating of Plastics" should read --Metallic Coating of Plastics--; line 40, "Metallic Coating of Plastics" should read --Metallic Coating of Plastics--; line 44, "step into" should read --steps into--; lines 72-73, "pre-not previouslyviously" should read --previously--. Column 13, line 15, "repated" should read --repeated--.

In the claims, claim 1, column 13, line 43, "$H_2SO_4$, or $Cr^{+6}$" should read --$H_2SO_4$, $Cr^{+6}$--.

Signed and Sealed this

Twenty-eighth Day of September 1976

[SEAL]

Attest:

RUTH C. MASON
*Attesting Officer*

C. MARSHALL DANN
*Commissioner of Patents and Trademarks*